United States Patent
Lau et al.

(10) Patent No.: US 6,711,498 B1
(45) Date of Patent: Mar. 23, 2004

(54) METHOD FOR OPERATING A NAVIGATION SYSTEM FOR A VEHICLE

(75) Inventors: Stefan Lau, Pomona, NY (US); Heinrich Schmidt, Diekholzen (DE); Ralf Hoffmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/070,593

(22) PCT Filed: Aug. 16, 2000

(86) PCT No.: PCT/DE00/02745

§ 371 (c)(1),
(2), (4) Date: Jul. 12, 2002

(87) PCT Pub. No.: WO01/18770

PCT Pub. Date: Mar. 15, 2001

(30) Foreign Application Priority Data

Sep. 8, 1999 (DE) .................................. 199 42 847

(51) Int. Cl.⁷ .............................................. G01C 21/00
(52) U.S. Cl. ..................................................... 701/209
(58) Field of Search ................. 701/200, 201, 701/202, 204, 205, 207–211, 213; 340/995, 990; 342/357, 454, 456–457

(56) References Cited

U.S. PATENT DOCUMENTS 5,878,368 A   3/1999  DeGraaf
5,911,773 A * 6/1999  Mutsuga et al. ............ 701/200
6,351,707 B1 * 2/2002 Ichikawa ..................... 701/209

FOREIGN PATENT DOCUMENTS

| DE | 198 15 141 |   | 11/1998 | |
|----|-----------|---|---------|---|
| EP | 0 292 897 | * | 5/1988  | ............ G08G/1/09 |
| EP | 0 292 897 |   | 11/1988 | |
| EP | 0 702 201 | * | 3/1996  | ........... G01C/21/20 |
| EP | 0 702 210 |   | 3/1996  | |

* cited by examiner

*Primary Examiner*—Thu V. Nguyen
(74) *Attorney, Agent, or Firm*—Kenyon & Kenyon

(57) ABSTRACT

A method for operating a navigation system for a vehicle, particularly for a motor vehicle, in which a travel route is calculated in a computing circuit on the basis of a location of the vehicle, a digitally stored map and a destination location, and is made available to the vehicle driver as an acoustical and/or visual message, where traffic information relevant to the travel route may be acquired via a receiver unit and a new travel time t resulting therefrom is calculated for the existing travel route with the aid of a predefined weighting factor $G_f$ for a disturbance event and the length of a traffic disturbance $L_s$, and a travel time $t_a$ is calculated in the same manner for an alternative route, and in the event that the travel time $t_a$ of the alternative route is shorter than the travel time t of the travel route, is indicated to the vehicle driver. A correction value K for the weighting factors $G_f$ is ascertained on the basis of the length of the traffic disturbance $L_s$, and a corrected weighting factor $G_k$ is ascertained as a function of the correction value $K_w$ and is used for calculating the new travel time t.

8 Claims, No Drawings

METHOD FOR OPERATING A NAVIGATION SYSTEM FOR A VEHICLE

FIELD OF THE INVENTION

The present invention relates to a method for operating a navigation system for a vehicle, particularly for a motor vehicle.

BACKGROUND INFORMATION

It is known to equip motor vehicles with navigation systems which are able to make available to the vehicle driver, a travel route in the form of an acoustical or visual message. To calculate the travel route, the navigation system generally falls back on a digitally stored map which also contains a structure of a road type (e.g. expressway or country road). Furthermore, a travel destination and location of the motor vehicle should be known. The travel destination is entered into the navigation system by the vehicle driver via a suitable input device. The location can be determined in a known manner, for example, by radio location. With the aid of these inputs, the travel route with the least travel time can be determined in a simple manner.

To additionally take the instantaneous traffic situation into account, it is also known to continuously acquire traffic information via a receiver unit (e.g. as RDS/TMC or GSM signals). The traffic information contains details about the type of traffic disturbance (disturbance event), for example, traffic jam, halting, dense or busy traffic, as well as about the length of the traffic disturbance. In known navigation systems, the disturbance event is taken into account in the form of a weighting factor which is multiplied by an average speed otherwise possible on this type of road. Thus, a new travel time for the existing travel route is yielded on the basis of the length of the traffic disturbance. This travel time is continuously compared to a travel time for at least one alternative route, and in the event that the travel time of the alternative route is shorter than the travel time of the travel route, the alternative route is indicated to the vehicle driver.

Disadvantageous in such a method is that it does not adequately take into account a subjective feeling of the vehicle driver with respect to the traffic disturbance to be expected. Thus, as is known, different vehicle drivers feel extremely differently about the same traffic disturbance. For example, for many vehicle drivers, driving in a traffic jam represents a stress situation which they would avoid, even putting up with a longer travel time overall.

SUMMARY OF THE INVENTION

According to the present invention, a method is provided for operating the navigation system. Because a correction value K is ascertained for weighting factors $G_f$ in light of the length of the traffic disturbance $L_s$, and a corrected weighting factor $G_k$, used to calculate new travel time t, is ascertained as a function of correction value K, it is possible to adapt the navigation system individually to the subjective feeling of the vehicle driver. In particular, the subjective feeling of the vehicle driver may be suitably taken into account when calculating alternative routes.

Correction value K may be determined with the aid of a family of characteristics or a predefined formula. Thus, corrected weighting factor $G_k$ can preferably be determined according to the formula $$G_k = G_f \cdot K$$

with $K = L_s/n*100$, where $n \geq 1$, and in the event that $G_k$ becomes $\leq 0$, an alternative route is automatically calculated. Because the vehicle driver determines the value for n, it is possible to take his/her subjective feeling with respect to the length of the traffic disturbance $L_s$ into consideration.

DETAILED DESCRIPTION

The present invention is explained more precisely below in light of an exemplary embodiment.

Modem vehicles, particularly motor vehicles, contain navigation systems. Such navigation systems include a plurality of components such as a location ascertainment, a computing circuit having suitable data memory, an input device and an output device for visual or acoustical signals. In addition, such navigation systems may be assigned a receiver unit for traffic information.

The location of the motor vehicle may be determined in a known manner by radio location. It is likewise known to store a digital map in the data memory. Such digital maps also contain, inter alia, information about a type of road, (e.g. autobahn or country road) and the average speed possible there. For example, the average speed for driving on the autobahn can be established at 130 km per hour.

The vehicle driver specifies a travel destination to the navigation system via the input device. A travel route having the shortest travel time t is determined within the computing circuit based on the travel destination, the location of the motor vehicle and the digital map. The travel route is subsequently made available to the vehicle driver in visual or acoustical form via the output device.

According to the present invention, a subjective feeling of the vehicle driver with respect to the length of a possible traffic disturbance $L_s$ is additionally taken into consideration for establishing the travel route or for the output of alternative routes. To that end, traffic information relevant to the travel route is first acquired via the receiver unit. This can be done in a known manner, for example, from RDS/TMC or GSM signals.

The traffic information includes details about the length of the traffic disturbance $L_s$, as well as about the disturbance event itself. In this context, initially weighting factors $G_f$ are allocated to the individual disturbance events. Thus, for example, a weighting factor of 0.1 may be allocated to the disturbance event "traffic jam", a weighting factor $G_f$ of 0.25 may be allocated to the disturbance event "halting traffic", and a weighting factor $G_f$ of 0.9 may be allocated to the disturbance event "busy traffic". A new travel time t for the existing travel route is ascertained with the aid of weighting factors $G_f$ and the length of the traffic disturbance $L_s$. At the same time, a travel time $t_a$ is calculated in the same manner for an alternative route, and in the event that travel time $t_a$ of the alternative route is shorter than travel time t of the travel route, is indicated to the vehicle driver.

In the method of the present invention, a correction value K for weighting factors $G_f$ is ascertained from the length of the traffic disturbance $L_s$, and a corrected weighting factor $G_k$ is calculated as a function of correction value K and is ultimately used for calculating new travel time t. Correction value K may either be taken from a family of characteristics, in which specific correction values K are assigned to the length of the traffic disturbance $L_s$, or may be calculated with the aid of a predefined formula. In the latter case, corrected weighting factor $G_k$ is calculated according to the formula $$G_k = G_f \cdot K \quad \text{(I)}$$

where $K = L_s/100n$ \quad (II)

In this context, $n \geq 1$, and in the event that $G_k \leq 0$, an alternative route is automatically output.

By selecting a value for n, the vehicle driver is able to determine to what extent his/her subjective feeling is taken into consideration when calculating alternative routes. With increasing value n, travel time t also rises in response to the presence of a given length of a traffic disturbance $L_s$. Thus, for example, an alternative route may be offered very much sooner to a relatively impatient vehicle driver who feels a traffic disturbance such as a traffic jam to be a stress situation. The vehicle driver merely sets value n sufficiently high.

For the purpose of clarification, in the following, the method of the present invention for determining new travel time t is compared illustratively to a conventional method. The input variables are a total distance $L_A$ of 30 km on the autobahn, an average speed v of 130 km/h, a length of traffic disturbance $L_s$ of 10 km, a weighting factor $G_f$ for the traffic jam of 0.1 and a value for n=2. Consequently, yielded for the conventional method is a travel time of $$t = \frac{L_A - L_s}{v} + \frac{L_s}{v^* G_f} = 55.4 \text{ min.} \quad \text{(III)}$$

In contrast, travel time t when working with the method of the present invention is $$t = \frac{L_A - L_s}{v} + \frac{L}{v^* G_k} = 101.5 \text{ min.} \quad \text{(IV)}$$

where $$G_k = G_f - K = G_f - \frac{L_s}{100n} = 0.05. \quad \text{(V)}$$

Thus, the difference of over 45 minutes in the travel times leads more quickly to the output of an alternative route.

What is claimed is:

1. A method for operating a navigation system of a vehicle, comprising:
   calculating a travel route in a computing circuit on the basis of a location of the vehicle, a digitally stored map, and a destination location;
   communicating the travel route to a vehicle driver as at least one of an acoustical message and a visual message;
   acquiring traffic information relevant to the travel route via a receiver unit;
   calculating a new travel time resulting from the traffic information and for the travel route in accordance with a weighting factor for a disturbance event and in accordance with a length of a traffic disturbance, the weighting factor for the disturbance event varying in accordance with a type of disturbance event;
   calculating a second travel time in the same manner for an alternative route; communicating at least one of the second travel time of the alternative route and the alternative route to the vehicle driver as at least one of an acoustical message and a visual message, if the second travel time is shorter than the new travel time of the travel route;
   ascertaining a correction value for predefined weighting factors on the basis of the length of the traffic disturbance; and
   ascertaining a corrected weighting factor as a function of the correction value;
   wherein:
   the new travel time is calculated using the corrected weighting factor:
   the correction value is ascertained in accordance with one of a family of characteristics and a predefined formula
   the corrected weighting factor is calculated according to the formula $G_k = G_f - K$, with $K = L_s/100*n$, $G_k$ being the corrected weighting factor, $G_f$ being the weighting factor for the disturbance event, K being the correction value, $L_s$ being the length of the traffic disturbance, n being greater than or equal to 1, the alternative route being automatically calculated if $G_k$ is less than or equal to 0.

2. The method according to claim 1, wherein:
   the vehicle driver inputs a subjective feeling with respect to the length of the traffic disturbance into the navigation system by determining a value for n, the new travel time rising with an increase in n, whereby the step of communicating at least one of the second travel time of the alternative route and the alternative route becomes more probable.

3. A method for operating a navigation system of a vehicle, the method comprising:
   calculating a travel route in a computing circuit on the basis of a location of the vehicle, a digitally stored map and a destination location;
   communicating the travel route to a vehicle driver as at least one of an acoustical message and a visual message;
   acquiring traffic information relevant to the travel route via a receiver unit;
   calculating a new travel time resulting from the traffic information and for the travel route in accordance with a weighting factor for a disturbance event and in accordance with a length of a traffic disturbance, the weighting factor for the disturbance event varying in accordance with a type of disturbance event
   calculating a second travel time in the same manner for an alternative route,
   communicating at least one of the second travel time of the alternative route and the alternative route to the vehicle driver as at least one of an acoustical message and a visual message, if the second travel time is shorter than the new travel time of the travel route;
   ascertaining a correction value for predefined weighting factors on the basis of the length of the traffic disturbance; and
   ascertaining a corrected weighting factor as a function of the correction value, wherein:
   the new travel time is calculated using the corrected weighting factor, and
   wherein, in addition to the length of the traffic disturbance, the correction value is ascertained on the basis of a vehicle driver selected value.

4. A method for operating a navigation system of a vehicle, the method comprising:
   calculating a travel route in a computing circuit on the basis of a location of the vehicle, a digitally stored map, and a destination location;
   communicating the travel route to a vehicle driver as at least one of an acoustical message and a visual message;

acquiring traffic information relevant to the travel route via a receiver unit;

calculating a new travel time resulting from the traffic information and for the travel route in accordance with a weighting factor for a disturbance event and in accordance with a length of a traffic disturbance;

calculating a second travel time in the same manner for an alternative route;

communicating at least one of the second travel time of the alternative route and the alternative route to the vehicle driver as at least one of an acoustical message and a visual message, if the second travel time is shorter than the new travel time of the travel route;

ascertaining a correction value for predefined weighting factors on the basis of the length of the traffic disturbance and a vehicle driver selected value; and ascertaining a corrected weighting factor as a function of the correction value, wherein:
the new travel time is calculated using the corrected weighting factor.

5. A method for operating a navigation system of a vehicle, the method comprising:

calculating a travel route in a computing circuit on the basis of a location of the vehicle, a digitally stored map, and a destination location;

communicating the travel route to a vehicle driver as at least one of an acoustical message and a visual message;

acquiring traffic information relevant to the travel route via a receiver unit;

calculating a new travel time resulting from the traffic information and for the travel route in accordance with a weighting factor for a disturbance event and in accordance with a length of a traffic disturbance;

calculating a second travel time in the same manner for an alternative route;

communicating at least one of the second travel time of the alternative route and the alternative route to the vehicle driver as at least one of an acoustical message and a visual message, if the second travel time is shorter than the new travel time of the travel route;

ascertaining a correction value for predefined weighting factors on the basis of the length of the traffic disturbance; and ascertaining a corrected weighting factor as a function of the correction value, wherein:
the new travel time is calculated using the corrected weighting factor; and wherein:
the corrected weighting factor is calculated according to the formula $Gk=Gf-K$, with $K=Ls/100*n$, Gk being the corrected weighting factor, Gf being the weighting factor for the disturbance event, K being the correction value, Ls being the length of the traffic disturbance, n being greater than or equal to 1, the alternative route being automatically calculated if Gk is less than or equal to 0.

6. The method according to claim 5, wherein:
the vehicle driver inputs a subjective feeling with respect to the length of the traffic disturbance into the navigation system by determining a value for n, the new travel time rising with an increase in n, whereby the step of communicating at least one of the second travel time of the alternative route and the alternative route becomes more probable.

7. The method according to claim 5, wherein, in addition to the length of the traffic disturbance, the correction value is ascertained on the basis of a vehicle driver selected value.

8. The method according to claim 5, wherein the weighting factor for the disturbance varies in accordance with a type of disturbance event.

* * * * *